UNITED STATES PATENT OFFICE.

CLAYTON W. BEDFORD, OF AKRON, OHIO, ASSIGNOR TO THE GOODYEAR TIRE & RUBBER COMPANY, OF AKRON, OHIO, A CORPORATION OF OHIO.

ART OF COMPOUNDING RUBBER.

1,380,765. Specification of Letters Patent. Patented June 7, 1921.

No Drawing. Application filed July 12, 1919. Serial No. 310,463.

*To all whom it may concern:*

Be it known that I, CLAYTON W. BEDFORD, a citizen of the United States, and resident of Akron, Ohio, have invented new and useful Improvements in the Art of Compounding Rubber, of which the following is a specification.

This invention relates to the art of compounding rubber, and has particular reference to the dispersion of a substance, specifically a soluble accelerator of vulcanization, throughout the mixture of ingredients to be incorporated with rubber prior to the vulcanization thereof.

The objects and advantages of my method will be readily understood from the following description:

Hitherto, it has been customary in the milling of rubber compounds, first to soften the rubber on the mills, and then to add to the softened rubber the compounding materials such as sulfur, fillers, accelerators and the like, which may be added as a rough mechanical mixture thereof, or separately; for example, the accelerator is often added separately at or near the end of the milling operation. Such methods, however, have not been found entirely satisfactory, inasmuch as a perfectly homogeneous mixture is not obtained, especially when an accelerator other than one having a low melting point, is used.

I have discovered that by first dissolving any of the soluble ingredients in a volatile solvent, and mixing the solution with the fillers, pigments or other insoluble compounding ingredients, aside from the rubber itself, before incorporating with the rubber prior to vulcanization, and then evaporating the solvent, I am able to produce a finished product wherein the constituents are thoroughly and evenly distributed and which is uniformly of superior quality.

I have found that only sufficient solvent need be used to dissolve the soluble ingredient and to wet the mass of material to a consistency of a thick dough. The mass is then mixed and the mixture dried preferably with continual stirring, during the initial stages of evaporation, to avoid the formation of large crystals of the solute and to aid in the dispersion of the latter throughout the mix, but after the greater part of the solvent is driven off, the stirring may be discontinued. When sufficiently dry, the mass is ground and sifted, and is then ready to be incorporated into a rubber mix. This resulting product is very homogeneous, and I have found that the minute particles of the soluble ingredient are evenly and equally distributed about any particle of the insoluble ingredients.

My method is particularly adapted for the incorporation into the mix, of chemicals commonly known as accelerators, which are active in the cure, and especially those which do not easily melt or quickly dissolve and flow into the rubber during the cure. I have found that my invention is especially applicable to two classes of accelerators. First, those accelerators having a melting point so high that they melt with difficulty and therefore, flux so slowly into the mix that an intense localized reaction may take place before the accelerator has become uniformly distributed throughout the mix, if the methods hitherto in use be practised. Such accelerators then tend to give overvulcanized spots, which are often large enough to be seen, but if not visible, are evidenced by a lower tensile strength of the stock. Even with a lower melting accelerator the same localized action often takes place, if the accelerator be very quick acting. In such a case the outside of each accelerator particle, is believed to react very rapidly with the sulfur and produce a film around the exterior of each particle, thus preventing or largely interfering with the complete solution of the particle in the rubber mix during the cure.

The second class of accelerators to which my invention is especially applicable, comprises those which are relatively insoluble in rubber as such, for example, hexamethylene-tetramin. When compounded in the usual way, hexamethylene-tetramin fails to disperse and dissolve uniformly throughout the rubber, although after the reaction with sulfur the new product formed does become more soluble. It will be readily apparent, that this reaction with sulfur is greatly facilitated if the accelerator be already dispersed over the surface of the sulfur particles at the time of incorporation in the mix.

By the practice of my invention, I am enabled to obtain a vulcanized product having a high tensile strength, and one having practically no over-cured points, owing to the complete and thorough inter-mixture of the ingredients therein.

In order that my invention may be more fully understood the following examples are given as illustrations of how my method may be carried out, though it will be understood that these are merely illustrations, and are not to be construed as the only modes in which the method may be practised:

1. About 200 parts of hexamethylene-tetramin are dissolved in at least as much water as is required for its complete solution, which will require a minimum of about 300 parts. This solution is then added to approximately 300 parts of sulfur and the mixture is thoroughly stirred while drying. It is then vacuum dried, ground, and sifted. The dry mixture is then incorporated with the rubber mix on the mills, made into finished form and vulcanized.

2. In place of the sulfur used in Example 1, about 300 parts of zinc oxid (ZnO), a mixture of sulfur and zinc oxid, or some other suitable filler or pigment may be used, sufficient water being used to completely wet the mass and to uniformly distribute the solution throughout the mass.

3. About 135 parts of thiocarbanilid are dissolved in at least as much alcohol as is required for its complete solution. If the solution be heated, about 1000 parts of the solvent will be required. This hot solution is then added to about 315 parts of sulfur and the mixture is dried, preferably while stirring, ground, and sifted. It is then ready for use in a rubber mix, with which it is incorporated on the mills, made into desired form and vulcanized.

While I have described my invention in considerable detail, it is to be understood that I do not mean to be limited to the use of the particular ingredients mentioned, merely as examples, or in any way, except by the claims hereto annexed. And it is further to be understood, that my invention is not to be construed as dependent on the accuracy or soundness of any theories herein expressed.

What I claim is:

1. The method of producing vulcanized rubber, which consists in dissolving an accelerator, mixing the solution with a compounding ingredient, incorporating the mixture with rubber, and vulcanizing the rubber compound.

2. The method of producing vulcanized rubber, which consists in dissolving an accelerator, mixing the solution with a compounding ingredient, removing the solvent, incorporating the mixture with rubber, and vulcanizing the rubber compound.

3. The method of producing vulcanized rubber, which consists in dissolving hexamethylene-tetramin, mixing the solution with a compounding ingredient, incorporating the mixture with rubber, and vulcanizing the rubber compound.

4. The method of producing vulcanized rubber, which consists in dissolving hexamethylene-tetramin, mixing the solution with a compounding ingredient, removing the solvent, incorporating the mixture with rubber, and vulcanizing the rubber compound.

5. The method of producing vulcanized rubber, which consists in dissolving hexamethylene-tetramin in water, mixing the solution with a compounding ingredient, incorporating the mixture with rubber, and vulcanizing the rubber compound.

6. The method of producing vulcanized rubber, which consists in dissolving hexamethylene-tetramin in water, mixing the solution with a compounding ingredient, removing the water, incorporating the mixture with rubber, and vulcanizing the rubber compound.

7. The method of producing a vulcanized rubber, which consists in dissolving hexamethylene-tetramin, mixing the solution with sulfur, incorporating the mixture with rubber, and vulcanizing the rubber compound.

8. The method of producing a vulcanized rubber, which consists in dissolving hexamethylene-tetramin in water, mixing the solution with sulfur, removing the water, incorporating the mixture with rubber, and vulcanizing the rubber compound.

9. The process of curing rubber which comprises incorporating into a rubber mix, a compounding ingredient containing an accelerator homogeneously dispersed by means of a carrier liquid therethrough, removing the carrier liquid and heating the resulting mixture with a vulcanizing agent to effect vulcanization.

10. The process of curing rubber which comprises incorporating into a rubber mix, sulfur containing an accelerator homogeneously dispersed by means of a carrier liquid therethrough, removing the carrier liquid and heating the resulting mixture to effect vulcanization.

11. The process of curing rubber which comprises incorporating into a rubber mix, sulfur containing hexamethylene-tetramin homogeneously dispersed by means of a carrier liquid therethrough, removing the carrier liquid and heating the resulting mixture to effect vulcanization.

In witness whereof, I have hereunto signed my name in the presence of two subscribing witnesses.

CLAYTON W. BEDFORD.

Witnesses:
L. M. HARTMAN,
E. C. LEADENHAM.